United States Patent
Gottschlich et al.

[11] Patent Number: 5,769,927
[45] Date of Patent: Jun. 23, 1998

[54] MONOMER RECOVERY PROCESS

[75] Inventors: Douglas Gottschlich, Mountain View; Marc L. Jacobs, Berkeley, both of Calif.

[73] Assignee: Membrane Technology and Research, Inc., Menlo Park, Calif.

[21] Appl. No.: 789,377

[22] Filed: Jan. 24, 1997

[51] Int. Cl.[6] ................................................ B01D 53/22
[52] U.S. Cl. .................................. 95/39; 95/50; 95/247; 95/258; 95/266; 585/818
[58] Field of Search ............................. 95/39, 45, 47–55, 95/243, 247, 258, 259, 266; 585/818

[56] References Cited

U.S. PATENT DOCUMENTS

| | | | |
|---|---|---|---|
| 2,214,368 | 9/1940 | Greensfelder et al. | 95/39 |
| 4,424,341 | 1/1984 | Hanson et al. | 528/501 |
| 4,444,571 | 4/1984 | Matson | 95/50 X |
| 4,466,202 | 8/1984 | Merten | 95/50 X |
| 4,501,885 | 2/1985 | Sherk et al. | 528/501 |
| 4,553,983 | 11/1985 | Baker | 55/16 |
| 4,589,957 | 5/1986 | Sherk et al. | 203/75 |
| 4,623,704 | 11/1986 | Dembicki et al. | 526/68 |
| 4,654,063 | 3/1987 | Auvil et al. | 95/55 X |
| 4,732,583 | 3/1988 | DeLong et al. | 95/55 |
| 4,772,295 | 9/1988 | Kato et al. | 95/50 |
| 4,857,078 | 8/1989 | Watler | 55/16 |
| 4,885,063 | 12/1989 | Andre | 203/73 |
| 4,892,564 | 1/1990 | Cooley | 95/55 |
| 4,906,256 | 3/1990 | Baker et al. | 55/16 |
| 4,963,165 | 10/1990 | Blume et al. | 55/16 |
| 4,994,094 | 2/1991 | Behling et al. | 55/16 |
| 5,000,006 | 3/1991 | Itoh et al. | 95/39 X |
| 5,032,148 | 7/1991 | Baker et al. | 55/16 |
| 5,053,067 | 10/1991 | Chretien | 95/55 X |
| 5,069,686 | 12/1991 | Baker et al. | 55/16 |
| 5,082,481 | 1/1992 | Barchas et al. | 95/55 X |
| 5,086,623 | 2/1992 | Gauthier | 95/55 X |
| 5,089,033 | 2/1992 | Wijmans | 55/16 |
| 5,127,926 | 7/1992 | Baker et al. | 55/16 |
| 5,157,200 | 10/1992 | Mikkinen et al. | 95/55 X |
| 5,199,962 | 4/1993 | Wijmans | 55/16 |
| 5,205,843 | 4/1993 | Kaschemekat et al. | 55/16 |
| 5,281,255 | 1/1994 | Toy et al. | 95/50 |
| 5,314,579 | 5/1994 | Sung | 159/47.1 |
| 5,374,300 | 12/1994 | Kaschemekat et al. | 95/39 |
| 5,414,190 | 5/1995 | Förg et al. | 95/50 X |
| 5,452,581 | 9/1995 | Dinh et al. | 62/24 |
| 5,501,722 | 3/1996 | Toy et al. | 95/50 |
| 5,647,227 | 7/1997 | Lokhandwala | 95/50 X |
| 5,669,958 | 9/1997 | Baker et al. | 95/39 X |
| 5,670,051 | 9/1997 | Pinnau et al. | 95/45 X |

OTHER PUBLICATIONS

R.W. Baker and M. Jacobs, "Improve Monomer Recovery from Polyolefin Resin Degassing," Hydrocarbon Processing, Mar. 1996.

*Primary Examiner*—Robert Spitzer
*Attorney, Agent, or Firm*—J. Farrant

[57] ABSTRACT

A process for treating a purge vent stream from a polymer manufacturing operation, the vent stream containing a polymer, such as ethylene or propylene, and a purge gas, such as nitrogen. The invention involves three separation steps: condensation, flash evaporation and membrane separation. The steps are integrated together in such a way as to provide a good separation between the components, and to avoid creation of secondary streams that need additional treatment.

35 Claims, 4 Drawing Sheets

MONOMER RECOVERY PROCESS

FIELD OF THE INVENTION

The invention concerns polymer manufacturing. More specifically, the invention concerns the recovery of monomer, such as ethylene and propylene, from resin degassing purge vents in polymer manufacturing plants.

BACKGROUND OF THE INVENTION

More than 100 polyolefin manufacturing plants are operating today in the United States. In a typical polymerization process, the raw polymer product contains significant amounts of unreacted monomer, and may contain small amounts of solvents, catalysts, stabilizers, other hydrocarbons or any other materials, depending on the manufacturing process used. To remove these contaminants, the raw polymer resin is passed to large bins, where nitrogen is used to purge them out. The vent gas from this step contains nitrogen, olefin monomer, and other process-specific materials.

These waste gases, besides being a potential source of air pollution, are not without value. The vent gas from a typical resin purge bin contains 500–1,000 lb/h of recoverable monomer and processing solvent, plus 1,000–2,000 lb/h of recoverable nitrogen. At current costs, these constituents have a potential recovered value of about $1 million/year/purge bin.

A common current treatment for vent gas is to flare it. While this is preferable to direct discharge, it is clearly more preferable yet to recover the components for reuse. Recovery systems using condensation under pressure are installed in a number of plants, but are costly because of the low temperatures that must be reached, typically −100° C. or below, especially for ethylene recovery. Thus, the need for better monomer recovery techniques remains.

Separation of certain gas mixtures by means of selective membranes has been known to be possible for many years, and membrane-based gas separation systems are emerging to challenge conventional separations technology in a number of areas. That membranes have the potential to separate organic vapors from other gases is also known. For example, U.S. Pat. Nos. 4,553,983; 4,857,078; 4,963,165; 4,906,256; 4,994,094; 5,032,148; 5,069,686; 5,127,926; 5,281,255 and 5,501,722 all describe membranes, systems or processes suitable for such separations. Likewise, it has been recognized that condensation and membrane separation may be combined, as is shown in U.S. Pat. Nos. 5,089,033; 5,199,962; 5,205,843 and 5,374,300.

SUMMARY OF THE INVENTION

The invention is a process for treating a purge vent stream from a polymer manufacturing operation. Although the process can be applied to any polymer manufacturing operation that produces a purge vent stream, applicants believe it is of particular use in polyolefin manufacturing, where vent streams containing an olefin, typically ethylene or propylene, and a purge gas, typically nitrogen, are produced. The invention involves three separation steps: condensation, flash evaporation and membrane separation.

In a basic embodiment, the process of the invention includes the following steps:
(a) compressing and cooling the purge vent stream, resulting in partial condensation of the stream, thereby dividing the stream into a condensed portion enriched in monomer and an uncondensed portion enriched in purge gas;
(b) flashing the condensed portion to at least partially remove additional amounts of purge gas as a gaseous flash stream, thereby creating a more-enriched monomer product stream;
(c) treating the uncondensed portion in a membrane separation unit, to create a more-enriched purge gas stream and a mixed stream;
(d) recirculating the flash stream and the mixed stream from the membrane to the condensation step, by returning them to the purge vent stream upstream of the partial condensation.

In a basic embodiment as it applied to polyolefin manufacturing, the process of the invention includes the following steps:
(a) compressing and cooling the purge vent stream, resulting in partial condensation of the stream, thereby dividing the stream into a condensed portion enriched in olefin and an uncondensed portion enriched in purge gas;
(b) flashing the condensed portion to at least partially remove additional amounts of purge gas as a gaseous flash stream, thereby creating a more-enriched olefin product stream;
(c) treating the uncondensed portion in a membrane separation unit, to create a more-enriched purge gas stream and a mixed stream;
(d) recirculating the flash stream and the mixed stream from the membrane to the condensation step, by returning them to the purge vent stream upstream of the partial condensation.

To applicants' knowledge, such an integrated combination of steps has not previously been used for these types of separation.

The condensation step is preferably carried out at a pressure no greater than about 500 psig and a temperature no lower than about −60° C.

The flash evaporation step is preferably carried out by lowering the pressure of the condensate stream, such as through an expansion valve.

The membrane separation step is preferably carried out using a membrane that has a selectivity for the olefin over the purge gas of at least about 5.

All of the unit separation operations may be performed as single-stage operations, or may be themselves carried out in multiple sub-steps.

By using the process outlined above, a better separation result is achieved than would be practically possible with any of the unit separation operations alone. When operated in the most preferred mode, the process produces only two streams: a purified monomer stream, which may be drawn off as a liquid from the bottom of the flash tank or allowed to vaporize; and the purified purge gas stream from the membrane separation unit.

We have discovered that it is possible to configure and operate a process acting on streams of typical compositions, such as up to about 50% or more olefin, so as to achieve both high purity, such as 90%, 95%, 99% or more in both the recovered monomer and purge gas streams. Purities of this order make it possible, in many cases, to reuse the purge gas for further purging and to recirculate the monomer to the polymerization reactor. At the same time, no secondary streams requiring external treatment or disposal are produced.

Both the flash evaporation step and the membrane separation step can produce streams that are significantly colder, such as 10° C., 20° C. or more colder than their respective feed streams. These streams can be used to provide cooling for the condensation step. In another aspect, therefore, the invention includes heat integration steps that can, in favorable cases, provide all or most of the cooling capacity required for condensation.

DETAILED DESCRIPTION OF THE INVENTION

Figure 1:
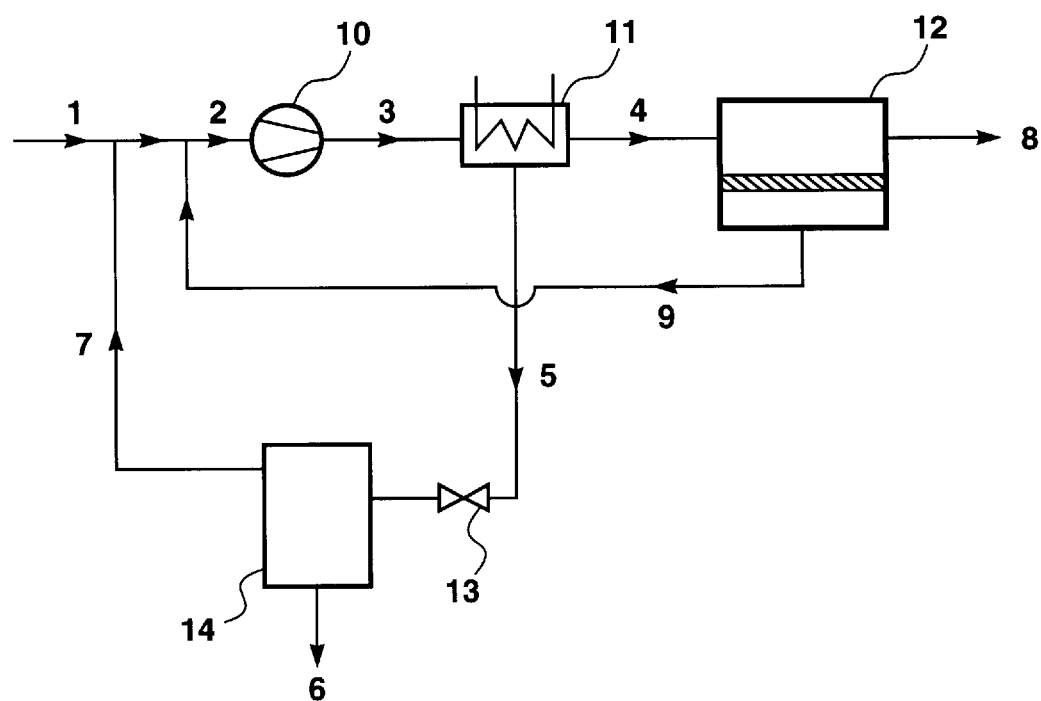
FIG. 1 is a schematic drawing showing a basic embodiment of the process.

The term gas as used herein means a gas or a vapor.

The term $C_{2+}$ hydrocarbon means a hydrocarbon having at least two carbon atoms; the term $C_{3+}$ hydrocarbon means a hydrocarbon having at least three carbon atoms; and so on.

The term olefin as used herein means a member of the family of unsaturated hydrocarbons having a carbon-carbon double bond of the series $C_nH_{2n}$, including members in which at least one halogen atom has been substituted for one of the hydrogen atoms.

All percentages herein are by volume unless otherwise stated.

The invention is a process for treating a purge vent stream from a polymer manufacturing operation. This vent stream typically emanates from the resin purge bins, where a gas is used to purge contaminants from the newly formed polymer particles These contaminants are process-specific, depending upon which polymer is being manufactured, the purity of the starting ingredients, and whether the process is a gas-phase process, a slurry process, a solution process or any other process.

The contaminants may include unreacted monomer and comonomers, solvents, catalysts, stabilizers, other hydrocarbons, or any other materials used or present in the polymerization reactor. To give just two specific examples, if nitrogen is used for purging and the purge vent stream comes from a gas-phase polypropylene manufacturing process, this stream might consist mostly of unreacted propylene and nitrogen. On the other hand, it is not uncommon for a purge vent stream from slurry or solution polyethylene manufacturing to contain, in addition to ethylene and nitrogen, significant amounts of ethane, methane, hydrogen, oxygen, and/or $C_3$–$C_6$ hydrocarbons.

Other streams that may be treated by the process of the invention may arise from other sources within the polymerization process, such as the polymerization reactor. The process of the invention can be applied to any polymer manufacturing process that generates a purge vent stream containing volatile monomer. However, we believe that the process of the invention is particularly useful in treating vent streams generated during manufacture of polyethylenes and polypropylenes, such as low-density and high-density homopolymers; substituted, including halogenated, homopolymers; copolymers, including, for example, ethylene-butylene copolymers; and terpolymers.

Most commonly, the purge gas used by polymer makers is nitrogen, which is inert and readily available. It will be appreciated, however, that our process is usable for separating other purge gases that might be used, such as air, or any other gas found to be suitable for this purpose.

The principal goal of the process is to separate the unreacted monomer, such as olefin monomer, from the gas used for purging the raw polymer, most preferably to such an extent that either or both are reusable.

The invention involves three separation steps: condensation, flash evaporation and membrane separation. The process is shown in a typical basic embodiment in FIG. 1. Turning now to this figure, feed stream, 1, is the purge vent stream from the polymerization process, containing at least unreacted monomer, purge gas and sometimes other contaminants. The stream, having been combined with recirculated streams, 7 and 9, to form inlet stream, 2, passes first through compressor, 10, to form compressed stream, 3, which then passes through heat exchanger or chiller, 11. The combination of compression and cooling results in the formation of a condensed stream, 5, containing the olefin monomer or other monomer (and other organic materials if present in the feed), but also containing some dissolved or condensed purge gas, and an uncondensed stream, 4, still containing some olefin monomer or other monomer.

The condensed stream or condensate, 5, then passes through expansion valve, 13, and into flash tank, 14. A portion of the condensate rapidly vaporizes, resulting in a volume of gas containing the purge gas, plus some monomer. This flashed gas, 7, is generally passed back to the inlet side of the compressor for reprocessing. The fraction that does not evaporate during flashing is withdrawn as olefin or other monomer product stream, 6. Stream 6 as it emerges still under pressure from the flash tank is liquid, but may be allowed to vaporize and be withdrawn from the process as a gaseous product.

The uncondensed stream, 4, is fed to a membrane separation unit, 12. The membrane unit contains a membrane that is selective for the monomer over the purge gas. Typically, a pressure difference between the feed and permeate sides of the membrane large enough to provide sufficient driving force for transmembrane permeation is provided by the upstream compressor, 10. To provide additional driving force, if desired, a vacuum pump could be connected on the permeate side of the membrane, so that permeate stream 9 is under partial vacuum. Alternatively, stream 4 could be subjected to additional compression. The membrane unit produces two streams, a residue stream, 8, and a permeate stream, 9. The residue stream, 8, is the purge-gas-enriched product stream. The permeate stream, 9, which is enriched in monomer content compared with membrane feed stream, 4, is usually returned to the inlet side of the compressor for further processing.

In FIG. 1, both of the streams recirculated to the condensation step are shown as returned to mix with the feed stream upstream of the compressor, 10. Alternatively, these streams could be recompressed separately and returned for mixing with the raw purge gas after compressor, 10, but upstream of condenser, 11.

Each of the steps is now discussed in more detail.

The goal of the condensation step is to bring the inlet gas stream to a pressure/temperature condition beyond the dewpoint of the olefin or other monomer that is to be recovered, so that a portion of that component will condense out of the gas stream in liquid form. The amount of monomer that can be removed from the gas stream in this way will depend on the boiling point, the concentration in the feed, and the operating conditions under which the condensation is performed.

The condensation step usually involves chilling and compression. Compressing, the gas raises the dewpoint temperature, so a combination of compression and chilling is generally preferred. Occasionally, however, the purge process, or other upstream treatments, may be such that stream 1 is already at high pressure, such as above 100 or 200 psig for example. In this case, chilling alone may suffice to induce condensation, and the compression step may be dispensed with. The recirculation streams, 7 and 9 in FIG. 1, must then be recompressed before remixing with the incoming high pressure feed stream.

It is desirable to avoid very high pressures and very low temperatures, since reaching these conditions adds to the cost and complexity of the process. By very high pressures, we mean pressures in excess of about 1,000 psig, or about 60 atm. The pressure at which the condensation step is operated should preferably be in the range below about 1,000 psig, more preferably below about 500 psig, and most preferably below about 250 psig.

By very low temperatures, we mean temperatures below −100° C. The temperature at which the condensation step is operated should preferably be above about −60°, and most preferably above about −40° C. Temperatures down to about the bottom of this most preferred range should be possible to reach by single-stage refrigeration, for example using propane as the cooling refrigerant. These temperatures are often much higher than could be used for recovery by compression/condensation alone.

The fraction of the unreacted monomer remaining in the condenser vent gas after the condensation step depends on the vapor/liquid equilibrium at the operating conditions under which the condensation step is performed. Staying within the confines of the preferred ranges stated above would be difficult, or impossible, if good recovery of, for example ethylene, were to be accomplished by condensation alone. However, since the process of the invention does not rely on condensation alone, high levels of recovery of even the low boiling olefins can be achieved under the above-defined modest temperature and pressure conditions. For example, suppose the condensation step removes only about 50% of the olefin content of the feed gas. This would be the case, for example, for an ethylene-containing feed at 400 psig and −90° C., or a propylene-containing feed at 200 psig and −30° C. If the condensation step is followed by a membrane separation step that can remove 80% of the olefin reaching it, then the total removal obtained is 90%. If the condensation step removes 80%, and is followed by a membrane separation step that also removes 80%, then the total removal is 96%. If the condensation step removes 80% and the membrane separation step 90%, the total removal is 98%.

In the practice of the invention, therefore, it is preferable only that the condensation step be designed to remove at least about 50% of the monomer present in the feed to the condenser, more preferably, at least about 70%. Operation under extreme conditions to achieve 90% or more removal during condensation is unnecessary, because the process does not rely on condensation alone to achieve the overall separation.

Optionally, it is even possible in favorable situations to operate the condensation step under conditions that would not reach the monomer dewpoint of feed stream 1 if the condensation step were acting alone. Suppose, for example, the condensation conditions that it is convenient to use represent a saturation concentration of 15%, whereas stream 1 contains only 12% olefin. Referring again to FIG. 1, stream 2, the stream that enters the condensation step, is made up of stream 1, plus recirculated streams 7 and 9 from the flash and membrane separation steps. Because the membrane is olefin-selective, membrane permeate stream, 9, is higher in olefin content than membrane feed stream, 4. However, stream 4 is also the condenser off-gas stream, which is at saturation concentration under the condensation conditions. Stream 9, being olefin-enriched compared with stream 4, is, therefore, above saturation concentration under the condensation conditions, and may, depending on how the membrane step is configured and operated, contain as much as 30%, 40% or higher olefin. The mixing of stream 9 with stream 1 therefore enriches the olefin content thereof and can, if the proportions are right, raise the dewpoint of the condenser inlet stream high enough for useful condensation to occur.

The goal of the process is to separate the gas mixture into only two product streams: the purge gas stream exiting after the membrane separation step and the monomer stream exiting as the bottom stream from the flash evaporation step. Typically, there will be composition targets for each stream. For example, to be clean enough for reuse or environmentally acceptable discharge, the purge gas stream might be required to contain no more than 5%, 1%, 500 ppm, 100 ppm or 10 ppm monomer. Likewise, to render it fit for return to the polymerization reactor, the monomer stream might be required to contain no more than 5%, 1%, 500 ppm, 100 ppm or 10 ppm purge gas. Depending on the original composition of the mixture, this may mean 50%, 80%, 90%, 99% or 99.9%, for example, monomer removal from the purge gas, coupled with 50%, 80%, 90%, 99% or 99.9% purge gas removal from the monomer.

The conditions under which the condensation step is carried out influence the compositions of both the condensed and uncondensed portions. If the condensation conditions were to be sufficiently extreme as to be beyond the dewpoint of the purge gas, then that component would start to condense. Even if the conditions do not reach the dewpoint of the purge gas, as will almost always be the case, it may dissolve in the liquefied monomer to some extent, and partition into the liquid phase. Thus, the higher the pressure and the lower the temperature at which the condensation is performed, the greater are the amounts of the purge gas that will be present in the monomer. For these reasons also, it is preferable to avoid extremes of pressure and temperature in the condensation step, since these will promote a less-enriched condensate.

If the condensation step necessitates cooling to below 0° C., and the gas stream contains water vapor, it is often convenient to use two chillers in series. The first chiller can be maintained at a temperature close to 0° C., and removes most of the entrained water. The second chiller is maintained at the lower temperature necessary to remove a substantial fraction of the higher-boiling component. Some water vapor will inevitably pass into the second chiller but the use of the first chiller will significantly reduce the need for defrosting the second. Alternatively, the condensation step may include another type of dehydration process through which the gas stream passes before it enters the condenser.

For simplicity, the condenser or chiller in FIG. 1 is identified by a single box, 11, from which the condensate liquid and remaining gas are shown emerging as discrete streams. It will be appreciated that, in practice, the condenser will often comprise a chiller, which produces a gas/liquid mixture, and a phase separator, in which the phases are separated and from which they are withdrawn as discrete streams. The same comment applies to FIGS. 2, 3 and 4.

Turning now to the flash evaporation step, this may be carried out by any convenient technique. Typically, flashing is achieved by letting down the pressure of the liquid to be flashed, thereby achieving essentially instantaneous conversion of a portion of the liquid to the gas phase. This may be done by passing the liquid through an expansion valve into a receiving tank or chamber, or any other type of phase separation vessel, for example. The released gas can be drawn off from the upper part of the chamber; the remaining liquid can be withdrawn from the bottom. It is often convenient, and we prefer, to carry out the flash evaporation by pressure release alone, since pressure reduction may be required anyway before the olefin or other monomer product can be recirculated to the polymerization reactor, transported or stored. Also, the preferred form for the recovered monomer in the plant is frequently a cold liquid.

Alternatively, flash evaporation can be achieved by sending the liquid to a vessel and raising the temperature, while maintaining the pressure at its previous value, or by a combination of pressure lowering and heating. Those of skill in the art will appreciate that the decision as to which method to use in any specific set of circumstances should be determined taking into account the environment in which the process is to be carried out, and the relative importance of product purity, operating costs and other factors.

During the flash step, it is preferred to bring the monomer condensate to a condition a little above the saturation vapor pressure of the monomer at that temperature. This controls loss of monomer into the gas phase. By a little above the saturation vapor pressure, we mean most preferably about 0–50 psig above the saturation vapor pressure at the flashing temperature.

The amounts and compositions of the flashed gas and the product liquid depend on the changes of pressure and temperature to which the condensate is subjected. Generally, the results are very close to a theoretical one-stage evaporation step and can be calculated to good reliability from tabulated thermodynamic data.

The energy taken to evaporate the flash gas results in a significant lowering of the temperature of the remaining monomer liquid, such as 10° C., 200° C. or more. If desired, this liquid may be used to cool the incoming stream, such as by running against the incoming stream in heat exchanger or chiller, 11, as discussed in more detail below.

Optionally, flashing may be carried out in two or more stages, such as by lowering the pressure incrementally. This type of operation produces several gas streams at different pressures. By removing at least a portion of the gas at high pressure, the cost of compression of the remainder is reduced.

Figure 2:
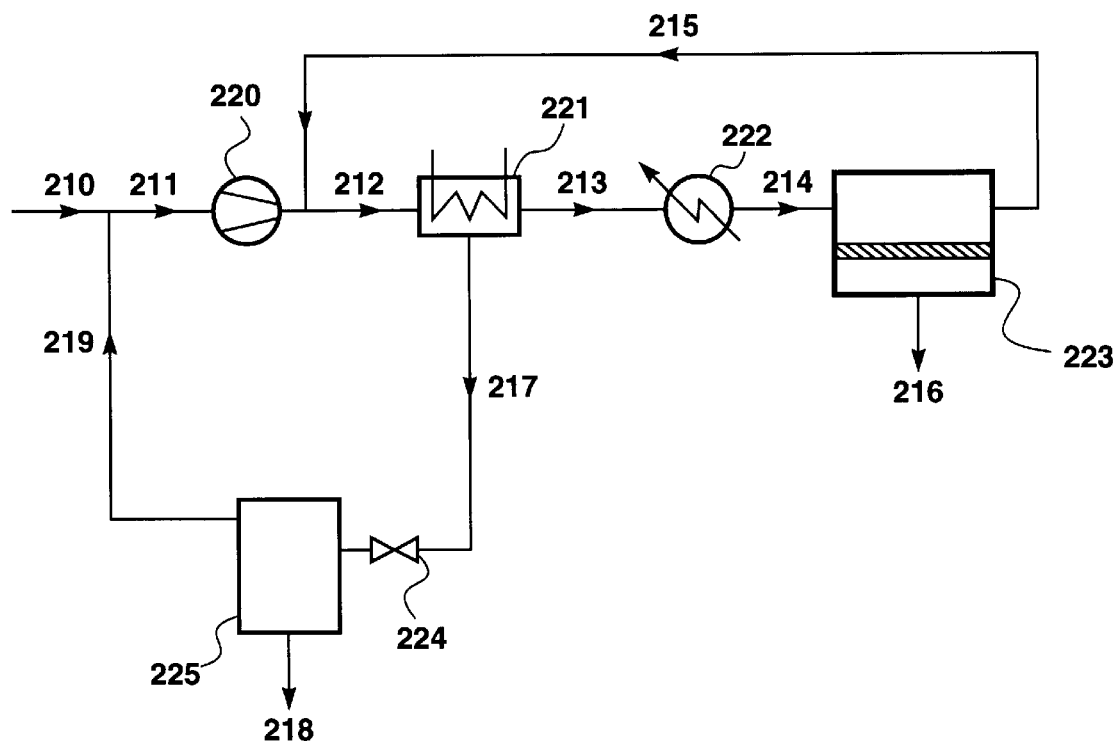
FIG. 2 is a schematic drawing showing an embodiment of the process using a membrane selective for the purge gas over the monomer.

The gas phase liberated during the flash evaporation step is shown in FIGS. 1 and 2 as being returned to the condensation step. This is a preferred operating mode for the process, because it eliminates a stream that may represent a secondary source of pollution or lost resources. However, depending on the specifics of plant operation, it may optionally be sent elsewhere, pooled with other waste streams, flared or the like, and such embodiments are within the scope of the invention.

The third unit separation process is membrane separation. The membrane unit contains a membrane that exhibits a substantially different permeability for the monomer gas than for the purge gas. It may be relatively permeable to the monomer but relatively impermeable to the purge gas, or relatively permeable to the purge gas but relatively impermeable to the monomer. Generally, we prefer to use a membrane selective for the monomer, for two reasons:

(i) the monomer is frequently the minor component of the stream to be separated. A separation done by preferentially permeating the minor component of the stream typically uses less membrane area than a separation in which the bulk of the stream to be treated has to pass through the membrane, (ii) monomer-selective membranes are usually elastomeric membranes, which tend to have much higher fluxes than glassy membranes.

Examples of polymers that can be used to make elastomeric membranes, include, but are not limited to, nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers, styrene/ethylene/butylene block copolymers, thermoplastic polyolefin elastomers, and block copolymers of polyethers, polyamides and polyesters.

Less preferred, but occasionally useful because of some atypical stream composition or properties, is to use a glassy membrane that will be selective for nitrogen or other purge gas over the monomer gas. Examples of polymers that can be used to make glassy membranes include, polysulfones, polyimides, polyamides, polyaramides, polyphenylene oxide, polycarbonates, ethylcellulose or cellulose acetate.

An exception to the general guidelines above is the use of super-glassy polymer membranes. Super-glassy polymers have a rigid structure, high glass transition temperatures, typically above 100° C., 200° C. or higher, and would normally be expected to be selective for smaller, less condensable molecules over larger, more condensable molecules. However, membranes made from certain of these polymers that have unusually high free volume within the polymer material have been found to exhibit anomalous behavior, in that they preferentially permeate larger, more condensable molecules over smaller, less condensable molecules. The best known super-glassy polymer identified to date is poly(trimethylsilylpropyne) [PTMSP], the use of which to preferentially separate condensable components from lower-boiling, less condensable components is described in U.S. Pat. No. 5,281,255, for example. This type of membrane would be useful in the present invention as a monomer-selective membrane. More detailed discussion of the choice of membrane for this type of separation may be found in co-owned and copending Ser. No. 08/780,868, entitled "Separation Process Combining Condensation, Membrane Separation and Flash Evaporation", which is incorporated herein by reference in its entirety.

The membrane may take the form of a homogeneous film, an integral asymmetric membrane, a multilayer composite membrane, a membrane incorporating a gel or liquid layer or particulates, or any other form known in the art. If elastomeric membranes are used, the preferred form is a composite membrane including a microporous support layer for mechanical strength and a rubbery coating layer that is responsible for the separation properties. If glassy membranes are used, an integral asymmetric membrane is the preferred form.

The membranes may be manufactured as flat sheets or as fibers and housed in any convenient module form, including spiral-wound modules, plate-and-frame modules and potted hollow-fiber modules. The making of all these types of membranes and modules is well known in the art. Flat-sheet membranes in spiral-wound modules are our most preferred choice.

Whatever their composition and structure, the membranes should preferably have a selectivity for the faster-permeating component over the other component of at least about 5, more preferably at least about 10 and most preferably at least about 20, and a pressure-normalized flux of the faster-permeating component of at least about $1\times10^{-6}$ cm$^3$(STP)/cm$^2$·s·cmHg, more preferably at least about $1\times10^{-5}$ cm$^3$(STP)/cm$^2$·s·cmHg.

As was stated above, usually no driving force beyond the compressor in the feed line is needed to run the membrane unit. If the raw gas stream is already at high pressure, such as 150 psig or above, before it enters the process however, it was already pointed out that the compressor in the feed line might be dispensed with and the condensation step carried out by cooling alone, without additional compression. In this case, the permeate stream, 9 in FIG. 1, will have to be recompressed before mixing with the incoming feed stream upstream of the chiller or condenser.

A single-stage membrane separation operation using a membrane with a selectivity of about 20 can typically remove up to about 80 or 90% of the preferentially permeating component from the feed stream and produce a permeate stream that has five times or more the concentration of that component of the feed gas. This degree of separation is adequate for many applications. If the residue stream requires further purification, it may be passed to a second bank of modules for a second processing step. If the permeate stream requires further concentration, it may be passed to a second bank of modules for a second-stage treatment. Such multistage or multistep processes, and variants thereof, will be familiar to those of skill in the art, who will appreciate that the membrane separation step may be configured in many possible ways, including single-stage, multistage, multistep, or more complicated arrays of two or more units in series or cascade arrangements. Such arrangements are referred to in more detail in co-owned and copending Ser. No. 08/789,376, entitled "Steam Cracker Gas Separation Process", and in U.S. Pat. No. 5,256,295, both of which are incorporated herein by reference in their entirety.

When the membrane separation step uses a membrane that is organic-selective, that is, is selective for the monomer over the purge gas, the residue and permeate streams from the membrane unit may be significantly colder than the membrane feed stream. This phenomenon, which is believed to arise because of Joule-Thomson cooling as the organic vapor expands across the membrane to the permeate side, is likely to occur if the membrane has a reasonably good selectivity for the monomer over the purge gas, such as about 10 or more, the monomer has a reasonably high concentration in the feed to the membrane unit, such as about 5%, 10% or more, and the removal of monomer from the membrane feed into the permeate is reasonably high, such as about 50%, 80%, 90% or more. The phenomenon is discussed in more detail in co-owned and copending Ser. No. 08/788,629, entitled "Membrane Expansion Process for Organic Component Recovery From Gases", which is incorporated herein by reference in its entirety.

Since the conditions mentioned above frequently obtain during monomer recovery according to the teachings herein, the membrane residue and permeate streams may typically be 5° C., 10° C. or more colder than the feed to the membrane unit, and it may be both convenient and beneficial to use one or both cold streams from the membrane separation step to provide or supplement cooling for the condensation step.

Figure 3:
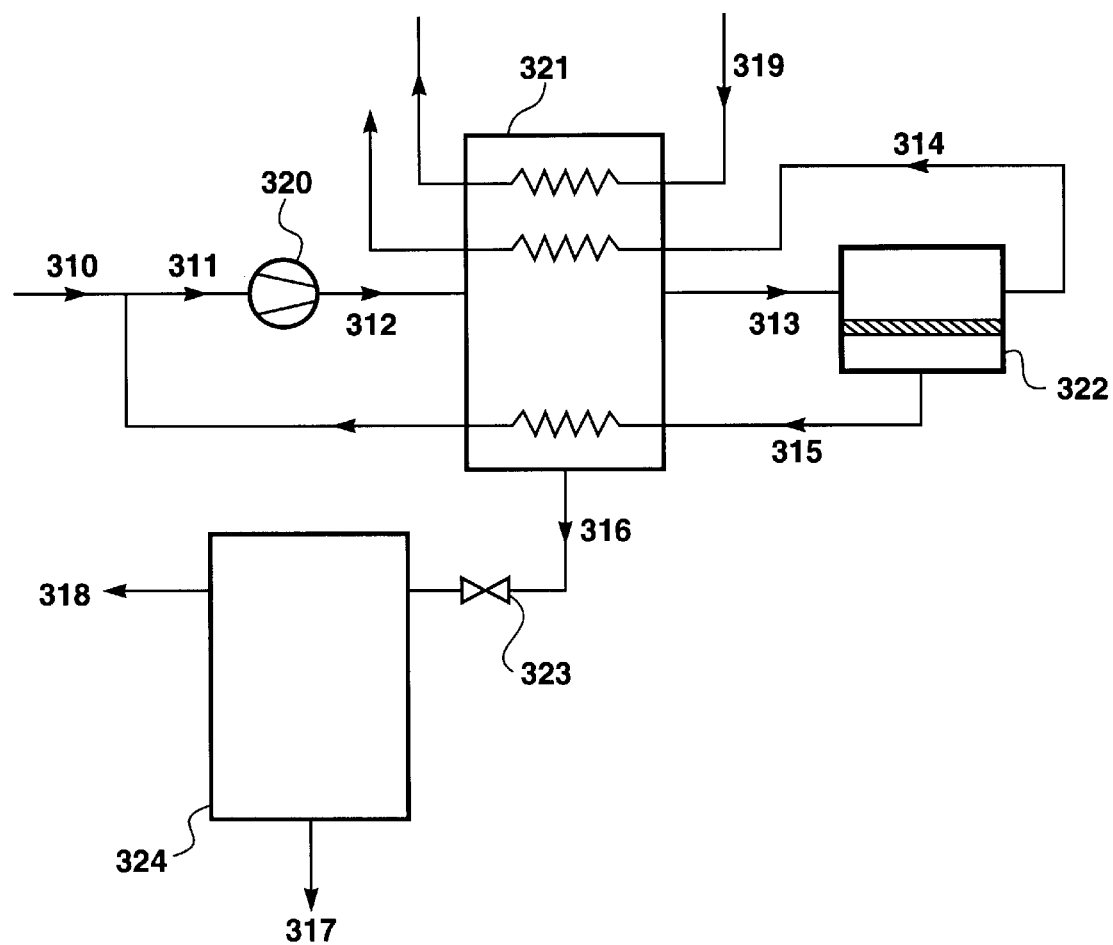
FIG. 3 is a schematic drawing showing an embodiment of the invention in which cooling for the condenser is provided by the membrane residue and permeate streams.

Such an arrangement is shown in FIG. 3. Turning to this figure, feed stream, 310, is the purge vent stream, which is combined with recirculated membrane permeate stream, 315, to form inlet stream, 311. Stream 311 passes through compressor, 320, to form compressed stream, 312, which then passes through heat exchanger or chiller, 321. In the embodiment shown in this figure, the heat exchanger is cooled by membrane residue stream, 314, membrane permeate stream, 315, and external refrigeration stream, 319. Other arrangements, in which only the residue or the permeate stream are used for cooling, or in which sufficient cooling capacity is extracted from the membrane return streams that no external refrigeration stream 319 is needed are also possible and within the scope of the invention.

The combination of compression and cooling results in the formation of condensed stream, 316, which is passed through expansion valve, 323, and into flash tank, 324. The evolved gas phase, stream 318, can be discharged to any destination, or returned as in FIG. 1 to the inlet side of the compressor for reprocessing. The liquid monomer product is withdrawn as stream, 317.

The uncondensed stream, 313, is fed to membrane separation unit, 322. The membrane unit contains a membrane that is selective for the monomer over the purge gas. The membrane unit produces residue stream, 314, which is the purified, purge-gas-enriched stream, and permeate stream, 315, the monomer-enriched stream, which is returned via the heat exchanger to the condensation step.

Figure 4:
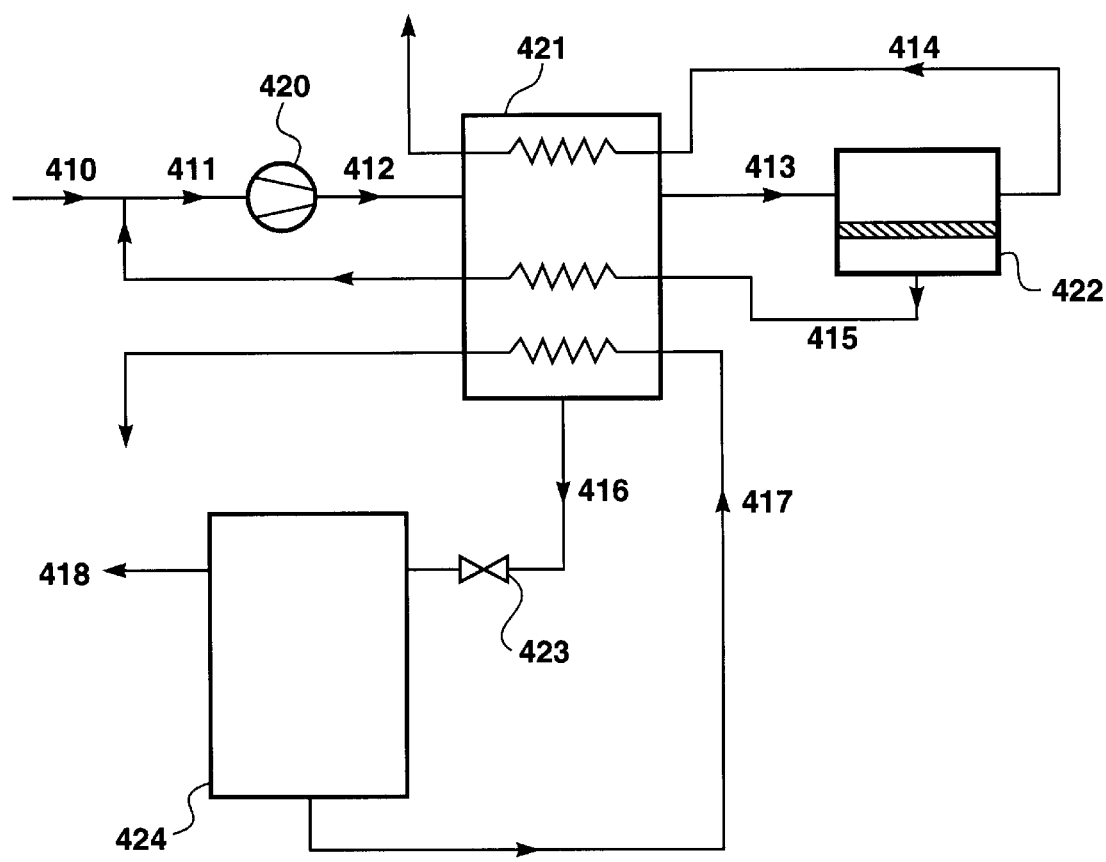
FIG. 4 is a schematic drawing showing an embodiment of the invention in which cooling for the condenser is provided by the membrane residue and permeate streams and the liquid monomer stream.

Another preferred embodiment that takes advantage of heat integration is shown in FIG. 4. Referring to this figure, feed stream, 410, is the purge vent stream, which is combined with recirculated membrane permeate stream, 415, to form inlet stream, 411. Stream 411 passes through compressor, 420, to form compressed stream, 412, which then passes through heat exchanger or chiller, 421. In this embodiment, the heat exchanger is cooled by membrane residue stream, 414, membrane permeate stream, 415, and the cold liquid monomer stream, 417, from the flash evaporation step. Thus, in this case, no external refrigeration need be supplied.

The combination of compression and cooling results in the formation of condensed stream, 416, which is passed through expansion valve, 423, and into flash tank, 424. The evolved gas phase, stream 418, can be discharged or recirculated. For even more cooling capacity, stream 418 could also be passed through heat exchanger, 421. The monomer product, which in this case has been warmed by passage through the heat exchanger, and may therefore be in the vapor phase rather than liquid, is withdrawn as stream, 417.

The uncondensed stream, 413, is fed to membrane separation unit, 422. The membrane unit contains a membrane that is selective for the monomer over the purge gas. The membrane unit produces residue stream, 414, which is the purified purge-gas-enriched stream, and permeate stream, 415, the monomer-enriched stream, which is returned via the heat exchanger to the condensation step.

Other configurations that offer attractive heat integration possibilities in specific situations will be apparent to those of skill in the art based on the above teachings.

The invention is now illustrated in further detail by specific examples. These examples are intended to further clarify the invention, and are not intended to limit the scope in any way.

EXAMPLES

Example 1

A computer calculation was performed using ChemCad III software (Chemstations Inc., Houston, Tex.) to model the treatment of a vent stream from a purge bin in a polypropylene manufacturing plant. The stream was assumed to contain about equal amounts of propylene and nitrogen, plus a few percent of propane and water vapor. The process configuration was assumed to be as in FIG. 1, except that it was assumed that a dryer is used between the compressor and the chiller to remove water vapor.

It was assumed that raw stream, 1, is at 25 psia and that inlet stream, 2, is compressed to 165 psia in compressor, 10, and cooled to −30° C. in chiller, 11. Under these conditions, uncondensed stream, 4, still contains about 21 mol % propylene. The membrane unit was assumed to contain a membrane selective for the $C_3$ hydrocarbons over nitrogen and to have the following permeability properties, which are typical of a silicone rubber membrane, for example:

| Gas: | Propylene | Pressure normalized flux ($\times 10^{-6}$ cm$^3$ (STP)/cm$^2$.s.cmHg) | 1,200 |
|---|---|---|---|
| | Propane | | 1,200 |
| | Nitrogen | | 80 |
| | Water vapor | | 2,500 |

After treatment in the membrane unit, the residue stream, 8, contains 99.9 mol % nitrogen. Condensate stream, 5, was assumed to be subjected to flash evaporation by reducing the pressure to 25 psia. The liquid product stream, 6, contains essentially no nitrogen.

The results of the calculation are shown in full in Table 1. Stream numbers correspond to FIG. 1, except that 3' indicates the stream composition after compression and drying.

TABLE 1

| | Stream | | | | | | | | |
|---|---|---|---|---|---|---|---|---|---|
| | 1 | 2 | 3' | 4 | 8 | 9 | 5 | 7 | 6 |
| Volume (scfm) | 375 | 905 | 894 | 690 | 175 | 515 | 204 | 15 | 189 |
| Temp. (°C.) | 25 | −0.5 | 35 | −30 | −37 | −37 | −30 | −41 | −41 |
| Pressure (psia) | 25 | 25 | 165 | 165 | 155 | 25 | 165 | 25 | 25 |
| Component (mol %): | | | | | | | | | |
| Propylene | 48.5 | 37.1 | 37.4 | 20.7 | 0.07 | 27.7 | 94.7 | 75.7 | 96.3 |
| Propane | 1.8 | 1.3 | 1.3 | 0.7 | — | 0.9 | 3.6 | 2.5 | 3.7 |
| Nitrogen | 46.5 | 60.2 | 60.7 | 78.6 | 99.9 | 71.4 | 1.7 | 21.9 | — |
| Water vapor | 3.1 | 1.3 | — | — | — | — | — | — | — |

— less than 0.01%

Example 2

As in Example 1, a ChemCad calculation was performed to model the treatment of a vent stream from a purge bin in a polypropylene manufacturing plant. In this case, the stream was assumed to come from a different type of polymerization process, and to contain some hexane and hydrogen, in addition to propylene, propane and nitrogen. The total $C_3$ content was assumed to be much lower than in Example 1, at about 12 mol %. The process configuration was again assumed to be as in FIG. 1.

It was assumed that raw stream, 1, is at 16 psia and 65° C., and that inlet stream, 2, is compressed to 200 psia in compressor, 10, and cooled to −30° C. in chiller, 11. Under these conditions, uncondensed stream, 4, still contains about 17 mol % propylene. The membrane unit was assumed to contain a membrane selective for the hydrocarbons over nitrogen and to have the following permeability properties, which are typical of a silicone rubber membrane, for example:

| Gas: | Propylene | Pressure normalized flux ($\times 10^{-6}$ cm$^3$ (STP)/cm$^2$.s.cmHg) | 1,200 |
|---|---|---|---|
| | Propane | | 1,200 |
| | Hexane | | 2,400 |
| | Nitrogen | | 80 |
| | Hydrogen | | 200 |

After treatment in the membrane unit, the residue stream, 8, contains about 2 mol % propylene. Condensate stream, 5, was assumed to be subjected to flash evaporation by reducing the pressure to 20 psia. The liquid product stream, 6, contains 99.9 mol % hydrocarbons.

The results of the calculation are shown in full in Table 2. Stream numbers correspond to FIG. 1.

TABLE 2

| | Stream | | | | | | | |
|---|---|---|---|---|---|---|---|---|
| | 1 | 2 | 4 | 5 | 7 | 6 | 9 | 8 |
| Volume (scfm) | 542 | 900 | 834 | 66 | 6.5 | 59 | 351 | 483 |
| Temp. (°C.) | 65 | 37 | −30 | −30 | −45 | −45 | −36 | −35 |
| Pressure (psia) | 16 | 16 | 200 | 200 | 205 | 20 | 155 | 190 |
| Component (mol %): | | | | | | | | |
| Hydrogen | 0.7 | 0.7 | 0.8 | — | 0.1 | — | 0.9 | 0.8 |
| Propylene | 11.8 | 22.1 | 16.8 | 90.0 | 75.4 | 91.6 | 37.2 | 2.0 |
| Propane | 0.7 | 1.2 | 0.9 | 5.4 | 3.9 | 5.6 | 1.9 | 0.1 |
| Hexane | 0.35 | 1.8 | — | 2.5 | — | 2.7 | — | — |
| Nitrogen | 86.5 | 75.7 | 81.5 | 2.1 | 20.6 | 0.1 | 60.0 | 97.1 |

— less than 0.01%

Example 3

During production of polyvinyl chloride (PVC), it is necessary to purge the polymerization reactor to remove air or other gases that would otherwise build up in the reactor. The purge gas from the reactor typically contains about equal amounts of vinyl chloride monomer and air. Conventionally, the purge gas may be subjected to condensation to recapture the vinyl chloride monomer.

A computer calculation was performed using ChemCad software to model the vinyl chloride/air separation. It was assumed that the process configuration used was as in FIG. 1, that raw stream, 1, is at 15 psia and that inlet stream, 2, is compressed to 75 psia in compressor, 10, and cooled to 4° C. in chiller, 11. Under these conditions, uncondensed stream, 4, still contains almost 40 mol % vinyl chloride. The membrane unit was assumed to contain a membrane selective for vinyl chloride over the components of air, and having the following permeability properties, which are typical of a silicone rubber membrane, for example:

| Gas: | Vinyl chloride | Pressure normalized flux | 1,440 |
|---|---|---|---|
| | Carbon dioxide | ($\times 10^{-6}$ cm$^3$ (STP)/cm$^2$.s.cmHg) | 800 |
| | Oxygen | | 170 |
| | Nitrogen | | 80 |

After treatment in the membrane unit, the residue stream, 8, contains 5 mol % vinyl chloride. Condensate stream, 5, was assumed to be subjected to flash evaporation by reducing the pressure to 15 psia. The liquid vinyl chloride product stream, 6, is essentially pure.

The results of the calculation are shown in Table 3. Stream numbers correspond to FIG. 1.

TABLE 3

| | Stream | | | | | | | |
|---|---|---|---|---|---|---|---|---|
| | 1 | 2 | 4 | 5 | 7 | 6 | 8 | 9 |
| Volume (m$^3$/h) | 199 | 390 | 296 | 94 | 2.0 | 92 | 106 | 190 |
| Component (mol %): | | | | | | | | |
| Vinyl chloride | 49.4 | 54.1 | 39.9 | 99.1 | 49.8 | 100 | 5.4 | 59.4 |
| Carbon dioxide | 0.4 | 2.3 | 2.9 | 0.4 | 22.0 | — | 7.5 | 4.1 |
| Oxygen | 7.1 | 8.7 | 11.4 | 0.1 | 6.1 | — | 13.3 | 10.3 |
| Nitrogen | 43.1 | 0.4 | 45.8 | 0.4 | 22.1 | — | 80.1 | 26.3 |

— less than 0.01%

Example 4

A computer calculation was performed using ChemCad software to model the same separation as in Example 3, that is, removal of air from vinyl chloride monomer. This time, however, it was assumed that an air-selective, vinyl chloride rejecting membrane was used in the membrane unit. Such a membrane might be a glassy membrane, such as a polysulfone or a polyimide membrane. Typical representative permeability properties were

| Gas: | Vinyl chloride | Pressure normalized flux | 1 |
|---|---|---|---|
| | Carbon dioxide | ($\times 10^{-6}$ cm$^3$ (STP)/cm$^2$.s.cmHg) | 120 |
| | Oxygen | | 30 |
| | Nitrogen | | 10 |

The process configuration was assumed to be as in FIG. 2. Referring now to that figure, raw stream, 210, is at 25 psia and 25° C. and contains about equal amounts of vinyl chloride and air. Inlet stream, 211, is compressed to 250 psia in compressor, 220, and compressed stream 212, which includes recirculated stream, 215, is cooled to 5° C. in chiller or condenser, 221. Under these conditions, uncondensed stream, 213, still contains about 15 mol % vinyl chloride. Since this stream is saturated with vinyl chloride, and will be further enriched in vinyl chloride content on the high-pressure side of the membrane unit, 223, the stream must be heated to avoid condensation of vinyl chloride within the membrane modules. To this end, heater, 222, is positioned between the condenser and the membrane unit. Heated stream, 214, passes to the membrane unit, where it is treated to yield vinyl-chloride-enriched residue stream, 215, which is recirculated upstream of the condenser. Permeate stream, 216, contains about 4 mol % vinyl chloride. Condensate stream, 217, was assumed to be subjected to flash evaporation by reducing the pressure to 25 psia by means of expansion valve, 224. The resulting flashed gas stream, 219, is recirculated upstream of compressor, 220. The liquid vinyl chloride product stream, 218, is withdrawn from the flash tank, 225. This stream contains about 99.6 mol % vinyl chloride.

The results of the calculation are shown in Table 4. Stream numbers correspond to FIG. 2.

TABLE 4

| | Stream | | | | | | | | |
|---|---|---|---|---|---|---|---|---|---|
| | 210 | 211 | 212 | 214 | 215 | 217 | 219 | 218 | 216 |
| Volume (scfm) | 118 | 121 | 136 | 77.0 | 14.9 | 59.1 | 3.4 | 55.7 | 62.0 |
| Component (mol %): | | | | | | | | | |
| Vinyl chloride | 49.4 | 49.8 | 50.9 | 15.0 | 60.0 | 97.6 | 63.9 | 99.6 | 4.3 |
| Carbon dioxide | 0.4 | 0.4 | 0.4 | 0.4 | — | 0.3 | 1.5 | 0.2 | 0.6 |
| Oxygen | 7.1 | 7.1 | 6.4 | 10.9 | 0.3 | 0.5 | 7.5 | — | 13.4 |
| Nitrogen | 43.1 | 42.7 | 42.3 | 73.6 | 39.7 | 1.7 | 27.1 | 0.1 | 81.7 |

— less than 0.01%

Example 5

A computer calculation similar to those of Examples 1 and 2 was performed using ChemCad III software (Chemstations Inc., Houston, Tex.) to model the treatment of a vent stream from a purge bin in a polypropylene manufacturing plant. In this case, however, the process configuration was assumed to be as in FIG. 4, that is, with no external cooling capacity provided. It was further assumed that the gas phase from the flash separator was returned and added to the membrane permeate stream before it passed into the heat exchanger. For the purposes of the calculations, it was assumed that the membrane residue and permeate streams are at the same temperature. Since there is good heat transfer within the membrane modules, this is a reasonable approximation.

Raw stream, 410, was assumed to have the composition shown in Table 5, plus traces of other non-condensable gases not shown in the table, to be at 30 psia and 35° C., and to be compressed to 200 psia. Other assumptions were as in Example 1. The results of the calculations are summarized in Table 5.

TABLE 5

| | Stream | | | | | | | |
|---|---|---|---|---|---|---|---|---|
| | 410 | 412 | 413 | 414 | 415 | 416 | 418 | 417 |
| Flow (lb/h) | 5,000 | 8,730 | 6,842 | 3,265 | 3,577 | 1,890 | 156 | 1,734 |
| Temp. (°C.) | 35 | 35 | −34 | −40 | −40 | −34 | −48 | −48 |
| Pressure (psia) | 30 | 200 | 200 | 184 | 32 | 200 | 25 | 25 |
| Component (mol %): | | | | | | | | |
| Propylene | 25.0 | 25.9 | 13.8 | 1.9 | 26.1 | 85.7 | 53.1 | 89.1 |
| Propane | 2.0 | 1.9 | 1.0 | 0.13 | 1.8 | 6.9 | 3.6 | 7.2 |
| Ethylene | 2.0 | 6.1 | 6.3 | 1.4 | 11.3 | 5.2 | 21.1 | 3.6 |
| Nitrogen | 70.0 | 64.5 | 77.1 | 95.1 | 58.6 | 2.0 | 21.0 | — |

— less than 0.01%

As can be seen, the process can produce an essentially pure monomer stream suitable for reuse, and a purge gas stream from the membrane containing 95 mol % nitrogen. This is accomplished without any external cooling. In this configuration, however, the purified monomer stream, 417, vaporizes in the heat exchanger, and so the product leaves the process as a gas rather than a liquid.

We claim:

1. A process for treating a purge stream from a polymer manufacturing operation, said purge stream comprising a monomer and a purge gas, said process comprising the following steps:
   (a) compressing said purge stream to a pressure no greater than about 1,000 psig;
   (b) cooling said purge stream to a temperature no lower than about −100° C., resulting in partial condensation of said purge stream, thereby dividing said purge stream into a condensed portion enriched in said monomer and an uncondensed portion enriched in said purge gas;
   (c) flash evaporating said condensed portion to at least partially remove additional amounts of said purge gas from said condensed portion as a gaseous flash stream, thereby creating a more-enriched monomer product stream;
   (d) membrane treating said uncondensed portion in a membrane separation unit, to further divide said uncondensed portion into a more-enriched purge gas stream and a mixed stream;
   (e) returning said mixed stream to said purge stream upstream of said partial condensation.

2. The process of claim 1, wherein said compressing step (a) is carried out at a pressure no greater than about 500 psig.

3. The process of claim 1, wherein said cooling step (b) is carried out at a temperature no lower than about −40° C.

4. The process of claim 1, wherein said flash evaporating step (c) is carried out by reducing the pressure of said condensed portion.

5. The process of claim 1, further comprising the following step:
   (f) returning said gaseous flash stream to said purge stream upstream of said partial condensation.

6. The process of claim 1, wherein said membrane treating step (d) is carried out using a membrane selective for said monomer over said purge gas.

7. The process of claim 1, wherein said membrane treating step (d) is carried out using a membrane having a selectivity for said monomer over said purge gas of at least about 20, and a pressure-normalized flux of said monomer of at least about $1 \times 10^{-6}$ cm$^3$(STP)/cm$^2 \cdot$s$\cdot$cmHg.

8. The process of claim 1, wherein said monomer comprises an olefin.

9. The process of claim 1, wherein said monomer comprises vinyl chloride.

10. The process of claim 1, wherein said purge gas comprises nitrogen.

11. The process of claim 1, wherein said cooling is achieved at least in part by heat exchange against said more-enriched monomer product stream.

12. The process of claim 1, wherein said cooling is achieved at least in part by heat exchange against said more-enriched purge gas stream.

13. The process of claim 1, wherein said cooling is achieved at least in part by heat exchange against said mixed stream.

14. A process for treating a purge stream from a polyolefin manufacturing operation, said purge stream comprising an olefin and a purge gas, said process comprising the following steps:
   (a) compressing said purge stream to a pressure no greater than about 1,000 psig;
   (b) cooling said purge stream to a temperature no lower than about −100° C., resulting in partial condensation of said purge stream, thereby dividing said purge stream into a condensed portion enriched in said olefin and an uncondensed portion enriched in said purge gas;
   (c) flash evaporating said condensed portion to at least partially remove additional amounts of said purge gas from said condensed portion as a gaseous flash stream, thereby creating a more-enriched olefin product stream;

(d) membrane treating said uncondensed portion in a membrane separation unit, to further divide said uncondensed portion into a more-enriched purge gas stream and a mixed stream;

(e) returning said mixed stream to said purge stream upstream of said partial condensation.

15. The process of claim 14, wherein said compressing step (a) is carried out at a pressure no greater than about 500 psig.

16. The process of claim 14, wherein said cooling step (b) is carried out at a temperature no lower than about −40° C.

17. The process of claim 14, wherein said flash evaporating step (c) is carried out by reducing the pressure of said condensed portion.

18. The process of claim 14, further comprising the following step:

(f) returning said gaseous flash stream to said purge stream upstream of said partial condensation.

19. The process of claim 14, wherein said membrane treating step (d) is carried out using a membrane selective for said olefin over said purge gas.

20. The process of claim 14, wherein said membrane treating step (d) is carried out using a membrane having a selectivity for said olefin over said purge gas of at least about 20, and a pressure-normalized flux of said olefin of at least about $1 \times 10^{-6}$ cm$^3$(STP)/cm$^2$·s·cmHg.

21. The process of claim 14, wherein said olefin comprises propylene.

22. The process of claim 14, wherein said olefin comprises ethylene.

23. The process of claim 14, wherein said purge gas comprises nitrogen.

24. The process of claim 14, wherein said cooling is achieved at least in part by heat exchange against said more-enriched olefin product stream.

25. The process of claim 14, wherein said cooling is achieved at least in part by heat exchange against said more-enriched purge gas stream.

26. The process of claim 14, wherein said cooling is achieved at least in part by heat exchange against said mixed stream.

27. A process for treating a purge stream from a polymer manufacturing operation, said purge stream comprising a monomer and a purge gas and being at a pressure of at least about 150 psig, said process comprising the following steps:

(a) cooling said purge stream to a temperature no lower than about −100° C.; resulting in partial condensation of said purge stream, thereby dividing said purge stream into a condensed portion enriched in said monomer and an uncondensed portion enriched in said purge gas;

(b) flash evaporating said condensed portion to at least partially remove additional amounts of said purge gas from said condensed portion as a gaseous flash stream, thereby creating a more-enriched monomer product stream;

(c) membrane treating said uncondensed portion in a membrane separation unit, to further divide said uncondensed portion into a more-enriched purge gas stream and a mixed stream;

(d) recirculating said mixed stream to said cooling step.

28. The process of claim 27, wherein said monomer comprises an olefin.

29. The process of claim 27, wherein said cooling is achieved at least in part by heat exchange against said more-enriched monomer product stream.

30. The process of claim 27, wherein said cooling is achieved at least in part by heat exchange against said more-enriched purge gas stream.

31. The process of claim 27, wherein said cooling is achieved at least in part by heat exchange against said mixed stream.

32. The process of claim 27, further comprising the following step:

(e) returning said gaseous flash stream to said purge stream upstream of said partial condensation.

33. A process for treating a purge stream from a polymer manufacturing operation, said purge stream comprising a monomer and a purge gas, said process comprising the following steps:

(a) compressing said purge stream to a pressure no greater than about 1,000 psig;

(b) cooling said purge stream, said cooling being provided at least in part by heat exchange against at least one colder stream to a temperature no lower than about −100° C., resulting in partial condensation of said purge stream, thereby dividing said purge stream into a condensed portion enriched in said monomer and an uncondensed portion enriched in said purge gas;

(c) flash evaporating said condensed portion to at least partially remove additional amounts of said purge gas from said condensed portion as a gaseous flash stream, thereby creating a more-enriched monomer product stream;

(d) membrane treating said uncondensed portion in a membrane separation unit, to further divide said uncondensed portion into a more-enriched purge gas stream and a mixed stream;

(e) returning said mixed stream to said purge stream upstream of said partial condensation; wherein said at least one colder stream is selected from the group consisting of said more-enriched purge gas stream, said mixed stream and said more-enriched monomer product stream.

34. The process of claim 33, wherein said at least one colder stream comprises said more-enriched purge gas stream and said mixed stream.

35. The process of claim 33, wherein said at least one colder stream comprises said more-enriched purge gas stream, said mixed stream and said more-enriched monomer product stream.

* * * * *